(12) United States Patent
Lu et al.

(10) Patent No.: US 12,009,505 B2
(45) Date of Patent: Jun. 11, 2024

(54) CONDUCTING POLYMER NETWORK/GRAPHENE-PROTECTED NEGATIVE ELECTRODE FOR A LITHIUM-ION BATTERY

(71) Applicant: Global Graphene Group, Inc., Dayton, OH (US)

(72) Inventors: Sheng-Yi Lu, Taipei (TW); Aruna Zhamu, Springboro, OH (US); Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 159 days.

(21) Appl. No.: 15/930,179

(22) Filed: May 12, 2020

(65) Prior Publication Data

US 2021/0359292 A1    Nov. 18, 2021

(51) Int. Cl.
| | |
|---|---|
| *H01M 4/36* | (2006.01) |
| *H01M 4/02* | (2006.01) |
| *H01M 4/133* | (2010.01) |
| *H01M 4/134* | (2010.01) |
| *H01M 4/137* | (2010.01) |
| *H01M 4/1393* | (2010.01) |
| *H01M 4/1395* | (2010.01) |
| *H01M 4/1399* | (2010.01) |
| *H01M 4/38* | (2006.01) |
| *H01M 4/60* | (2006.01) |
| *H01M 10/0525* | (2010.01) |

(52) U.S. Cl.
CPC .......... *H01M 4/364* (2013.01); *H01M 4/133* (2013.01); *H01M 4/134* (2013.01); *H01M 4/137* (2013.01); *H01M 4/1393* (2013.01); *H01M 4/1395* (2013.01); *H01M 4/1399* (2013.01); *H01M 4/38* (2013.01); *H01M 4/602* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2,798,878 A | 7/1957 | Hummers | |
| 8,691,443 B2* | 4/2014 | Uchida | H01M 4/1393 |
| | | | 429/246 |
| 8,834,959 B2* | 9/2014 | Drzal | H01G 11/36 |
| | | | 502/526 |
| 2004/0058232 A1* | 3/2004 | Kim | H01M 4/0483 |
| | | | 429/231.95 |
| 2005/0136330 A1 | 6/2005 | Mao et al. | |
| 2008/0305395 A1* | 12/2008 | Hirose | H01M 6/164 |
| | | | 429/223 |
| 2015/0024279 A1* | 1/2015 | Tan | H01M 10/052 |
| | | | 429/233 |
| 2016/0351949 A1* | 12/2016 | Taguchi | C09D 1/00 |
| 2017/0141397 A1* | 5/2017 | Lecuyer | H01M 4/382 |
| 2018/0248173 A1* | 8/2018 | Pan | H01M 4/405 |
| 2019/0157722 A1* | 5/2019 | Shin | H01G 11/60 |

FOREIGN PATENT DOCUMENTS

EP      2 991 136      *  3/2016

OTHER PUBLICATIONS

Gurunathan et al., "Synthesis of Hierarchically Porous SnO2 Microspheres and Performance Evaluation as Li-Ion Battery Anode by Using Different Binders" ACS Appl. Mater. Inter. (2014) vol. 6, No. 19, pp. 16556-16564.

* cited by examiner

*Primary Examiner* — Anca Eoff

(57) ABSTRACT

Provided is a composite layer of graphene sheets and anode particles being dispersed in a conducting polymer network for a lithium battery anode (negative electrode), the layer comprising a mixture of a conducting polymer network, multiple graphene sheets, and multiple particles of an anode active material, wherein the anode particles have a diameter or thickness from 0.5 nm to 20 μm and occupy from 30% to 98% by weight, the graphene sheets occupy from 0.01% to 25% by weight, and the conducting polymer network occupies from 1% to 30% by weight based on the total mixture weight and wherein the graphene sheets and the conducting polymer network together form dual conducting pathways for both electrons and lithium ions.

14 Claims, 5 Drawing Sheets

CONDUCTING POLYMER NETWORK/GRAPHENE-PROTECTED NEGATIVE ELECTRODE FOR A LITHIUM-ION BATTERY

The present disclosure relates generally to the field of lithium-ion batteries and, in particular, to a negative electrode (or anode) comprising conducting polymer network/graphene-protected anode active material for lithium-ion batteries.

BACKGROUND

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the purpose of the charge transfer between an anode and a cathode. As the SEI is formed, the lithium ions become part of the inert SEI layer and become irreversible, i.e. these positive ions can no longer be shuttled back and forth between the anode and the cathode during subsequent charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies $0<a\leq5$) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nano particles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conductive to lithium ions (e.g., ceramic or oxide coating). Ideally, the protective material should meet the following requirements: (a) The protective material must be lithium ion-conducting as well as initially electron-conducting (when the anode electrode is made) and be capable of preventing liquid electrolyte from being in constant contact with the anode active material particles (e.g. Si). (b) The protective material should also have high fracture toughness or high resistance to crack formation to avoid disintegration during cycling. (c) The protective material must be inert (inactive) with respect to the electrolyte, but be a good lithium ion conductor. (d) The protective material must not provide any significant amount of defect sites that irreversibly trap lithium ions. (e) The combined protective material-anode material structure must allow for an adequate amount of free space to accommodate volume expansion of the anode active material particles when lithiated. The prior art protective materials all fall short of these requirements. Hence, it is not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is a specific object of the present disclosure to meet these needs and address the issues associated the rapid capacity decay of a lithium battery containing a high-capacity anode active material.

SUMMARY

The present disclosure provides a layer of conducting polymer network/graphene-protected anode particles for a lithium battery anode. In some embodiments, the anode layer (or negative electrode layer, sheet, or film) comprises a mixture of a conducting polymer gel network, multiple graphene sheets, and multiple primary particles of an anode active material, wherein the multiple graphene sheets and the multiple primary particles are dispersed in or bonded by the conducting polymer network and wherein the anode active material primary particles have a diameter or thickness from 0.5 nm to 20 µm (preferably from 2 nm to 2 µm, further preferably from 3 nm to 500 nm, and most preferably from 5 nm to 100 nm) and occupy from 30% to 98% by weight based on the total mixture weight. The graphene sheets occupy from 0.01% to 25% by weight, and the conducting polymer network occupies from 1% to 30% by weight all based on the total mixture weight. The graphene sheets and the conducting polymer network together form dual conducting pathways for both electrons and lithium ions so that the graphene sheets and conducting polymer gel network combined have an electron conductivity from $10^{-8}$ S/cm to $10^3$ S/cm and lithium ion conductivity from $10^{-8}$ S/cm to $5.0 \times 10^{-3}$ S/cm when measured at room temperature without the presence of the anode active material particles.

This anode layer typically has a thickness from 100 nm to 2000 µm, more typically from 10 µm to 500 µm, and most typically from 50 µm to 200 µm. The layer can be thinner or thicker, if so desired.

Preferably, the conducting polymer gel network contains cross-linked chains of a conjugated polymer selected from Polyacetylene, Polythiophene, Poly(3-alkylthiophenes), Polypyrrole, Polyaniline, Poly(isothianaphthene), Poly(3,4-ethylenedioxythiophene) (PEDOT), alkoxy-substituted Poly (p-phenylene vinylene), Poly(2,5-bis(cholestanoxy) phenylene vinylene), Poly(p-phenylene vinylene), Poly(2,5-dialkoxy) paraphenylene vinylene, Poly[(1,4-phenylene-1, 2-diphenylvinylene)], Poly(3',7'-dimethyloctyloxy phenylene vinylene), Polyparaphenylene, Polyparaphenylene sulphide, Polyheptadiyne, Poly(3-hexylthiophene), Poly(3-octylthiophene), Poly(3-cyclohexylthiophene), Poly (3-methyl-4-cyclohexylthiophene), Poly(2,5-dialkoxy-1,4-phenyleneethynylene), Poly(2-decyloxy-1,4-phenylene), Poly(9,9-dioctylfluorene), Polyquinoline, a derivative thereof, a copolymer thereof, a sulfonated version thereof, or a combination thereof. In some preferred embodiments, the conducting polymer gel network comprises a polyaniline hydrogel, polypyrrole hydrogel, or polythiophene hydrogel in a dehydrated state.

Preferably, the conducting polymer network comprises a polyaniline hydrogel, polypyrrole hydrogel, or polythiophene hydrogel.

The multiple graphene sheets may contain single-layer or few-layer graphene, wherein said few-layer graphene sheets have 2-10 layers of stacked graphene planes having an inter-plane spacing $d_{002}$ from 0.3354 nm to 0.7 nm as measured by X-ray diffraction and said single-layer or few-layer graphene sheets contain a pristine graphene material having essentially zero % of non-carbon elements, or a non-pristine graphene material having 0.001% to 50% by weight of non-carbon elements. The non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

Preferably, the multiple graphene sheets in the anode layer have a sufficient amount that exceeds percolation threshold that form a 3D network of electron-conducting pathways. Preferably, the conducting network polymer itself or when in combination with the graphene sheets, constitute a 3D framework of lithium ion-conducting pathways.

The anode active material primary particles may contain particles pre-coated with a film of a conductive material selected from a carbon, pitch, carbonized resin, conductive polymer (linear or branched), conductive organic material, metal coating, metal oxide shell, graphene, or a combination thereof.

In some embodiments, the conducting polymer gel network is reinforced with a high-strength material selected from carbon nanotubes, carbon nano-fibers, carbon or graphite fibers, graphene sheets, expanded graphite flakes, polymer fibrils, glass fibers, ceramic fibers, metal filaments or metal nano-wires, whiskers, or a combination thereof.

The anode active material may be selected from the group consisting of: (a) silicon (Si), germanium (Ge), tin (Sn), lead (Pb), phosphorus (P), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, P, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium niobium oxide, lithium-containing titanium oxide, lithium mixed transition metal oxides; (f) prelithiated versions thereof; (g) particles of Li, Li alloy, or surface-stabilized Li having at least 60% by weight of lithium element therein; and (h) combinations thereof. The Li alloy may contain from 0.1% to 10% by weight of a metal element selected from Zn, Ag, Au, Mg, Ni, Ti, Fe, Co, V, Al, or a combination thereof.

In some embodiments, the particles of anode active material contain pre-lithiated particles. In other words, before the electrode active material particles (such as Si or $SnO_2$) are combined with a sacrificial material and embraced by graphene sheets, these particles have been previously intercalated with Li ions (e.g. via electrochemical charging) up to an amount of 0.1% to 30% by weight of Li. Such a pre-lithiating step may be conducted after the porous anode particulates are made.

The anode active material may contain a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein x=1 to 2.

The primary particles of anode active material may be in a form of nano particle, nano wire, nano fiber, nano tube, nano sheet, nano belt, nano ribbon, nano disc, nano platelet, or nano horn having a thickness or diameter from 0.5 nm to 100 nm. In some embodiments, at least one of the primary anode active material particles is coated with a layer of carbon, graphite, or graphene.

In some embodiments, the primary particles of anode active material contain particles pre-coated with a coating layer of a conductive material selected from carbon, pitch, carbonized resin, a conductive polymer, a conductive organic material, a metal coating, a metal oxide shell, graphene sheets, or a combination thereof. The coating layer thickness is preferably in the range from 1 nm to 20 μm, preferably from 5 nm to 10 μm, and further preferably from 10 nm to 1 μm.

In certain embodiments, at least one of the anode active material particles is coated with a layer of carbon or graphene prior to being mixed with the combined conducting polymer network/graphene sheets.

In certain preferred embodiments, anode active material primary particles are porous having surface pores, internal pores, or both surface and internal pores.

Typically and preferably, the anode layer has pores dispersed therein, wherein the pores have a size from 1 nm to 20 μm, more typically from 2 nm to 5 μm, and most typically from 10 nm to 2 μm.

The anode layer may further comprise a lithium ion-conducing polymer that is blended with the conducting polymer network wherein the lithium ion-conducting polymer is selected from poly(ethylene oxide), polypropylene oxide, poly(ethylene glycol), poly(acrylonitrile), poly(methyl methacrylate), poly(vinylidene fluoride), poly(bis ((methoxyethoxy)ethoxy)-phosphazene, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof. In certain embodiments, the conducting polymer network further comprises from 0.1% to 40% by weight of a lithium ion-conducting additive dispersed in the conducting polymer gel network. The lithium ion-conducting additive may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$. Alternatively, the lithium ion-conducting additive contains a lithium salt selected lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), lithium bis(oxalato)borate (LiBOB), lithium oxalyldifluoroborate ($LiBF_2C_2O_4$), lithium nitrate ($LiNO_3$), Li-perfluoroethyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, an ionic liquid-based lithium salt, or a combination thereof.

The layer may be in a form of a roll of film wound on a roller or is cut from a roll of film of the conducting polymer network/graphene-protected anode particles. Such a roll may be produced using a roll-to-roll or reel-to-reel process.

The layer may be supported by a layer of anode current collector selected from a thin foil, foam, or fabric of an electrically conducting material (e.g. Cu, Ni, Al, stainless steel, graphene, graphite, carbon fibers, or a combination thereof).

The present disclosure also provides a process for producing the aforementioned layer of conducting polymer network/graphene-protected anode particles. The process comprises: (a) dispersing multiple particles of the anode active material and multiple graphene sheets in a reacting liquid mass (or precursor solution) to form a reactive slurry, wherein the reacting liquid mass (or precursor solution) comprises a monomer, an initiator or catalyst, a cross-linker, a dopant, an oligomer, a solvent, or a combination thereof; (b) dispensing the reactive slurry to form a wet layer of reactive slurry on a solid substrate surface; and (c) allowing the reacting liquid mass to polymerize and cross-link to form a conducting polymer network gel having both the multiple graphene sheets and the multiple particles of the anode active material dispersed therein or mixed therewith, and removing any residual liquid component from the polymer network gel to obtain the layer of conducting polymer network/graphene-protected anode particles supported on the solid substrate surface.

The solid substrate may be selected from plastic film (e.g. PET film), stainless steel film, Cu foil, Al foil, nickel foam sheet, glass sheet, etc.

In certain embodiments, (b) comprises a procedure selected from casting, coating, spraying, printing, or painting the reactive slurry to form the wet layer of reactive slurry on the solid substrate surface.

Sub-process (b) may further comprise a procedure of exposing the reacting liquid mass to heat, UV light, microwaves, infrared, high-energy radiation, or a combination thereof to facilitate or accelerate polymerization and cross-linking of the reacting mass.

In some embodiments, the precursor solution may contain a monomer, an initiator or catalyst, a crosslinking or gelating agent, an oxidizer and/or dopant. During or after the dispensing procedure, one may initiate the polymerization and crosslinking reactions to produce lightly cross-linked networks of conducting polymer chains inside the deposited wet layer. These networks of polymer chains, if containing water or an organic liquid solvent, can become a gel.

In certain embodiments, the solid substrate is selected from a sheet, film, or block of a glass, ceramic, plastic, rubber, or metal and the process further comprises peeling off the wet layer after (b) or peeling off the layer of conducting polymer network/graphene-protected anode particles from the solid substrate after (c) to obtain a free-standing layer of conducting polymer network/graphene-protected anode particles.

The process preferably is a roll-to-roll process wherein (b) comprises (i) continuously feeding the solid substrate from a feeder roller into a deposition zone where the wet layer of reactive slurry is deposited on the solid substrate surface and (ii) collecting the layer of conducting polymer network/graphene-protected anode particles, with or without the supporting solid substrate surface, on a winding roller.

DETAILED DESCRIPTION OF PREFERRED EMBODIMENTS

A lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area.

Figure 2A:
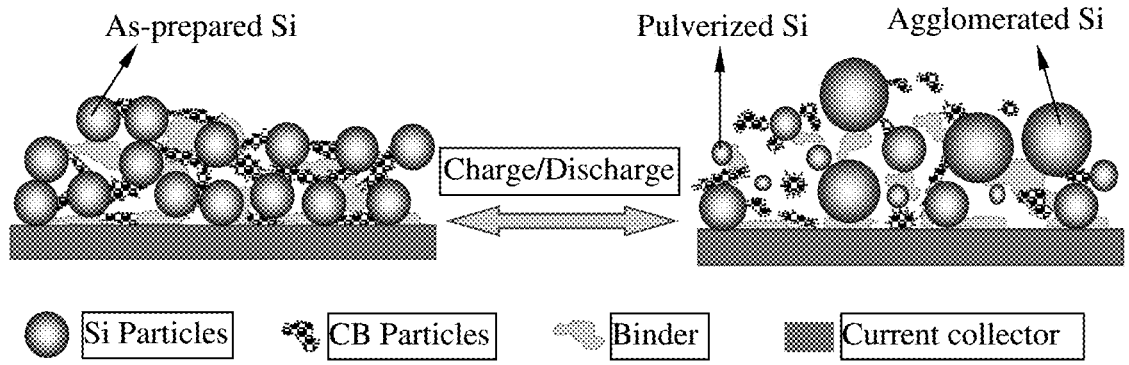
FIG. 2(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.

In order to obtain a higher energy density cell, the anode can be designed to contain higher-capacity anode active materials having a composition formula of $Li_aA$ (A is a metal or semiconductor element, such as Al and Si, and "a" satisfies 0<a≤5). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as discussed in the Background section, there are several problems associated with the implementation of these high-capacity anode active materials:

1) As schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nano particles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/or brittleness of the protective coating materials. There has been no high-strength and high-toughness material available that is itself also lithium ion conductive.

3) The approach of using a core-shell structure (e.g. Si nano particle encapsulated in a carbon or $SiO_2$ shell) also has not solved the capacity decay issue. As illustrated in upper portion of FIG. 2(B), a non-lithiated Si particle can be encapsulated by a carbon shell to form a core-shell structure (Si core and carbon or $SiO_2$ shell in this example). As the lithium-ion battery is charged, the anode active material (carbon- or $SiO_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery. These reactions continue to consume the electrolyte and reduce the cell's ability to store lithium ions.

Figure 2B:
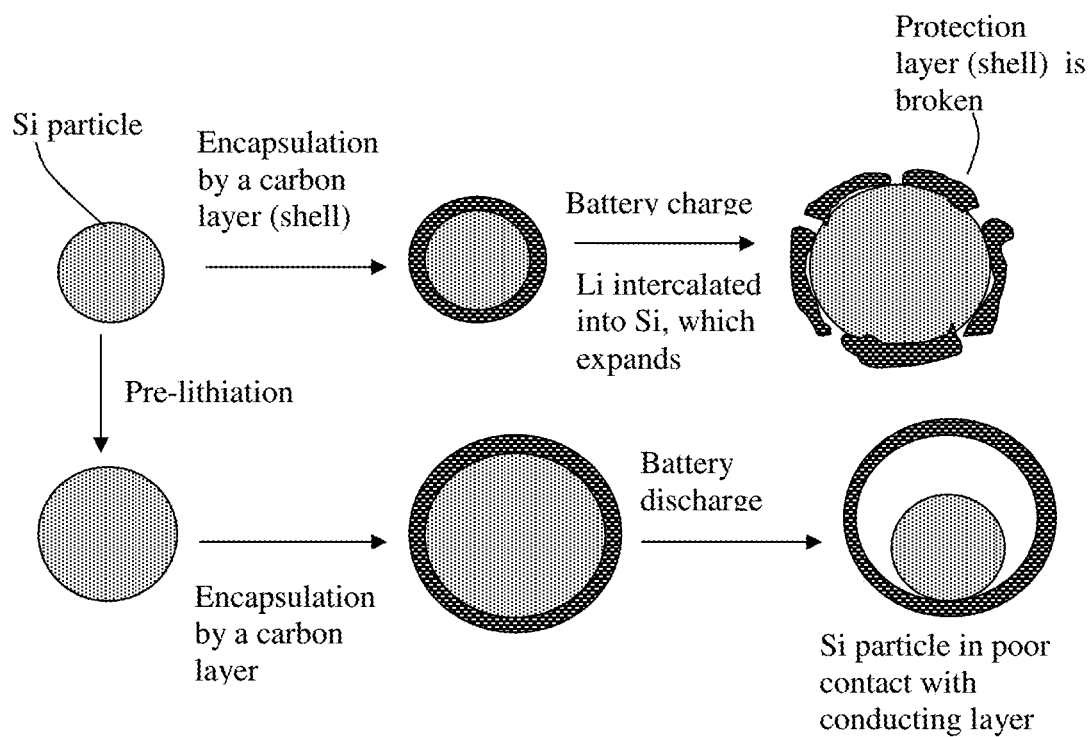
FIG. 2(B) illustrates the issues associated with prior art anode active material; for instance, a non-lithiated Si particle encapsulated by a protective shell (e.g. carbon shell) in a core-shell structure inevitably leads to breakage of the shell and that a pre-lithiated Si particle encapsulated with a protective layer leads to poor contact between the contracted Si particle and the rigid protective shell during battery discharge.

4) Referring to the lower portion of FIG. 2(B), wherein the Si particle has been pre-lithiated with lithium ions; i.e. has been pre-expanded in volume. When a layer of carbon (as an example of a protective material) is encapsulated around the pre-lithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these conflicting problems.

We have solved these challenging issues that have troubled battery designers and electrochemists alike for more than 30 years by developing the anode layer of conducting polymer gel network/graphene-protected anode active material particles (e.g. Si and $SiO_x$ particles, 0<x<2.0). The three basic ingredients (conducting polymer network, graphene sheets, and anode active material particles), plus other additives or reinforcement materials (if so desired), are combined and directly made into an anode electrode layer preferably on an anode current collector surface (e.g. Cu foil surface). In many cases, the conducting network polymer serves as a matrix or continuous phase in which both graphene sheets and anode particles are dispersed.

This is in contrast to the conventional anode production process that entails dispersing particles of an anode active material, binder resin (e.g. SBR), and a conductive additive (e.g. acetylene black) in a liquid medium (water or NMP) to form a slurry, which is followed by a long drying procedure to remove water or organic solvent, allowing binder resin to glue the anode particles and the conductive additive together. The binder forms a discrete phase that is not continuous and is typically ineffective in holding the anode particles and resin binder together when the anode particles (e.g. Si) expand during the battery charging operation. Further, the binder is not an electrically conductive polymer, thus inducing a large internal resistance.

The present disclosure provides a layer of conducting polymer network/graphene-protected anode particles for a lithium battery anode. In some embodiments, the anode layer (or negative electrode layer, sheet, or film) comprises a mixture of a conducting polymer gel network, multiple graphene sheets, and multiple primary particles of an anode active material, wherein the anode active material primary particles have a diameter or thickness from 0.5 nm to 20 μm and occupy from 30% to 98% by weight based on the total mixture weight. The graphene sheets occupy from 0.01% to 25% by weight, and the conducting polymer network occupies from 1% to 30% by weight all based on the total mixture weight. The graphene sheets and the conducting polymer network together form dual conducting pathways for both electrons and lithium ions so that the graphene sheets and conducting polymer gel network combined have an electron conductivity from $10^{-8}$ S/cm to $10^3$ S/cm and lithium ion conductivity from $10^{-8}$ S/cm to $5.0\times10^{-3}$ S/cm when measured at room temperature without the presence of the anode active material particles.

Preferably, the conducting polymer gel network contains chains of a conjugated polymer selected from Polyacetylene, Polythiophene, Poly(3-alkylthiophenes), Polypyrrole, Polyaniline, Poly(isothianaphthene), Poly(3,4-ethylenedioxythiophene) (PEDOT), alkoxy-substituted Poly(p-phenylene vinylene), Poly(2,5-bis(cholestanoxy) phenylene vinylene), Poly(p-phenylene vinylene), Poly(2,5-dialkoxy) paraphenylene vinylene, Poly[(1,4-phenylene-1,2-diphenyl-vinylene)], Poly(3',7'-dimethyloctyloxy phenylene vinylene), Polyparaphenylene, Polyparaphenylene sulphide, Polyheptadiyne, Poly(3-hexylthiophene), Poly(3-octylthiophene), Poly(3-cyclohexylthiophene), Poly(3-methyl-4-cyclohexylthiophene), Poly(2,5-dialkoxy-1,4-phenyleneethynylene), Poly(2-decyloxy-1,4-phenylene), Poly(9,9-dioctylfluorene), Polyquinoline, a derivative thereof, a copolymer thereof, a sulfonated version thereof, or a combination thereof. In some preferred embodiments, the conducting polymer gel network comprises a polyaniline hydrogel, polypyrrole hydrogel, or polythiophene hydrogel in a dehydrated state.

The graphene sheets may be selected from pristine graphene, graphene oxide, reduced graphene oxide, graphene fluoride, graphene chloride, graphene bromide, graphene iodide, nitrogenated graphene, hydrogenated graphene, doped graphene, chemically functionalized graphene, or a combination thereof.

The anode active material may be in a form of minute solid or porous particles (primary anode material particles) having a diameter or thickness from 0.5 nm to 10 μm (preferably from 1 nm to 100 nm). Preferably, the anode active material is a high-capacity anode active material having a specific lithium storage capacity greater than 372 mAh/g, which is the theoretical capacity of graphite.

The anode active material may be selected from the group consisting of: (a) silicon (Si), germanium (Ge), tin (Sn), lead (Pb), phosphorus (P), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, P, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium niobium oxide, lithium-containing titanium oxide, lithium mixed transition metal oxides; (f) prelithiated versions thereof; (g) particles of Li, Li alloy, or surface-stabilized Li having at least 60% by weight of lithium element therein; and (h) combinations thereof. The Li alloy may contain from 0.1% to 10% by weight of a metal element selected from Zn, Ag, Au, Mg, Ni, Ti, Fe, Co, V, Al, or a combination thereof.

In some embodiments, the particles of anode active material contain pre-lithiated particles. In other words, before the electrode active material particles (such as Si or $SnO_2$) are combined with a sacrificial material and embraced by graphene sheets, these particles have been previously intercalated with Li ions (e.g. via electrochemical charging) up to an amount of 0.1% to 30% by weight of Li. Such a pre-lithiating step may be conducted after the porous anode particulates are made.

The anode active material may contain a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, lithium titanate, or a combination thereof, wherein x=1 to 2.

The primary particles of anode active material may be in a form of nano particle, nano wire, nano fiber, nano tube, nano sheet, nano belt, nano ribbon, nano disc, nano platelet, or nano horn having a thickness or diameter from 0.5 nm to 100 nm. In some embodiments, at least one of the primary anode active material particles is coated with a layer of carbon, graphite, or graphene.

Figure 3A:
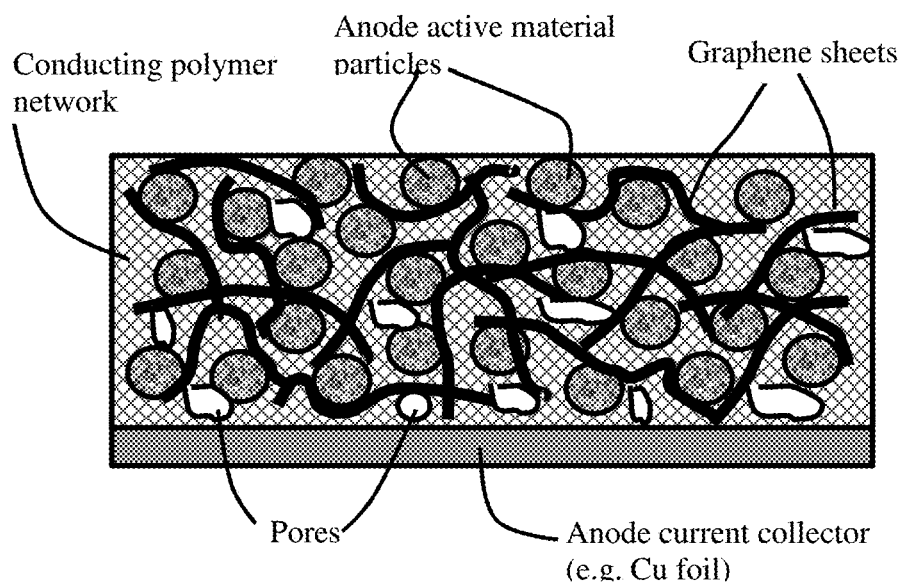
FIG. 3(A) Schematic drawing of an anode layer internal structure according to some embodiments of the present disclosure.
Figure 3B:
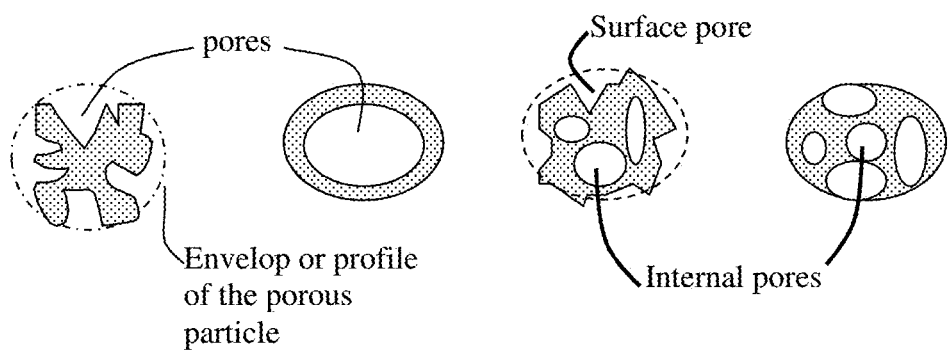
FIG. 3(B) Schematic drawing showing some examples of porous primary particles of an anode active material.

The primary particles themselves may be porous having porosity in the form of surface pores and/or internal pores. FIG. 3(B) shows some examples of porous primary particles of an anode active material. These pores of the primary particles allow the particle to expand into the free space without a significant overall volume increase of the particles and without inducing any significant volume expansion of the entire anode electrode. Typically, there are also pores inside the conducting polymer network/graphene matrix that provide additional empty space to accommodate the volume expansion of the anode active material.

The anode active material particles can contain those anode active materials capable of storing lithium ions greater than 372 mAh/g, theoretical capacity of natural graphite. Examples of these high-capacity anode active materials are Si, Ge, Sn, P, $SnO_2$, $SiO_x$, $Co_3O_4$, etc. As discussed earlier, these materials, if implemented in the anode, have the tendency to expand and contract when the battery is charged and discharged. At the electrode level, the expansion and contraction of the anode active material can lead to expansion and contraction of the anode, causing mechanical instability of the battery cell. At the anode active material level, repeated expansion/contraction of particles of Si, Ge, Sn, P, $SiO_x$, $SnO_2$, $Co_3O_4$, etc. quickly leads to pulverization of these particles and rapid capacity decay of the electrode.

The primary anode active material particles are preferably porous, having surface pores or internal pores, as schematically illustrated in FIG. 3(B). The production methods of porous solid particles are well-known in the art. For instance, the production of porous Si particles may be accomplished by etching particles of a Si—Al alloy using HCl solution (to remove the Al element leaving behind pores) or by etching particles of a Si—$SiO_2$ mixture using HF solution (by removing $SiO_2$ to create pores).

Porous $SnO_2$ nano particles may be synthesized by a modified procedure described by Gurunathan et al [P. Gurunathan, P. M. Ette and K. Ramesha, *ACS Appl. Mater. Inter.*, 6 (2014) 16556-16564]. In a typical synthesis procedure, 8.00 g of $SnCl_2 \cdot 6H_2O$, 5.20 g of resorcinol and 16.0 mL of 37% formaldehyde solution were mixed in 160 mL of $H_2O$ for about 30 minutes. Subsequently, the solution is sealed in a 250 mL round-bottom flask and kept in water bath at 80° C. for 4 hours. The resulting red gel is dried at 80° C. in an oven and calcined at 700° C. for 4 hours in $N_2$ and air atmosphere in sequence. Finally, the obtained white $SnO_2$ may be mechanically ground into finer powder for 30-60 minutes in mortar.

All types of porous anode active material particles may be produced by depositing the anode active material onto surfaces or into pores of a sacrificial material structure, followed by removing the sacrificial material. Such a deposition can be conducted using CVD, plasma-enhanced CVD, physical vapor deposition, sputtering, solution deposition, melt impregnation, chemical reaction deposition, etc.

Additionally, for the purpose of addressing the rapid battery capacity decay problems, the primary particles of anode active material may contain pre-lithiated particles. In other words, before the electrode active material particles (such as Si, Ge, Sn, $SnO_2$, $Co_3O_4$, etc.) are embedded in a sacrificial material matrix and then embraced by graphene sheets, these particles have already been previously intercalated with Li ions (e.g. via electrochemical charging).

In some embodiments, the particles of solid anode active material contain particles that are, prior to being embedded in a conducting polymer network, pre-coated with a carbon precursor material selected from a coal tar pitch, petroleum pitch, meso-phase pitch, polymer, organic material, or a combination thereof so that the carbon precursor material resides between surfaces of the solid electrode active material particles and the conducting polymer network, and the method further contains heat-treating the micro-droplets of conducting polymer network-encapsulated anode active material particles to convert the carbon precursor material to a carbon material coated on primary active material particle surfaces.

The anode layer may further comprise a lithium ion-conducing polymer that is blended with the conducting polymer network wherein the lithium ion-conducting polymer is selected from poly(ethylene oxide), polypropylene oxide, poly(ethylene glycol), poly(acrylonitrile), poly(m- ethyl methacrylate), poly(vinylidene fluoride), poly(bis ((methoxyethoxy)ethoxy)-phosphazene, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

The layer may further comprise a lithium ion-conducing material dispersed therein, wherein this lithium ion-conducting material is introduced into this anode layer prior to the combination of this anode layer with a separator, and a cathode to form a battery cell. This lithium ion-conducting material may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, wherein X=F, Cl, I, or Br, R=a hydrocarbon group, $0<x\leq1$, $1\leq y\leq4$, lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), lithium bis (oxalato)borate (LiBOB), lithium oxalyldifluoroborate ($LiBF_2C_2O_4$), lithium nitrate ($LiNO_3$), Li-perfluoroethylphosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, an ionic liquidbased lithium salt, or a combination thereof.

Bulk natural flake graphite is a 3-D graphitic material with each particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another.

The constituent graphene planes (typically 30 nm-2 μm wide/long) of a graphite crystallite can be exfoliated and extracted or isolated from the graphite crystallite to obtain individual graphene sheets of carbon atoms provided the inter-planar van der Waals forces can be overcome. An isolated, individual graphene sheet of hexagonal carbon atoms is commonly referred to as single-layer graphene. A stack of multiple graphene planes bonded through van der Waals forces in the thickness direction with an inter-graphene plane spacing of 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets or NGPs are a new class of carbon nano material (a 2-D nano carbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Pat. Pub. No. 2005/0271475 now abandoned); and (3) B. Z. Jang, A. Zhamu, and J. Guo, "Process for Producing Nanoscaled Platelets and Nanocomposites," U.S. patent application Ser. No. 11/509,424 (Aug. 25, 2006) (U.S. Pat. Pub. No. 2008/0048152 now abandoned).

Figure 1:
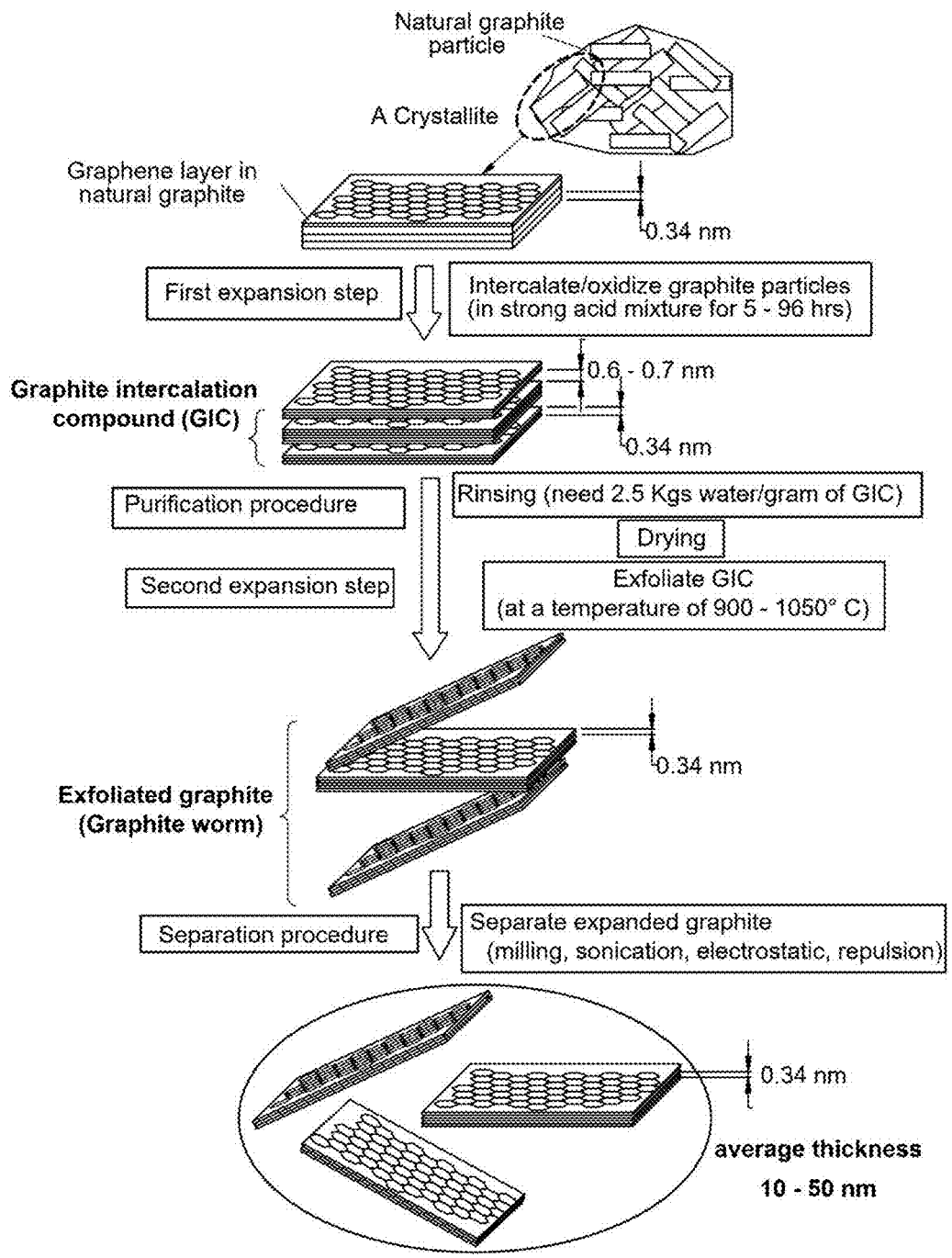
FIG. 1 A flow chart showing the most commonly used prior art process of producing highly oxidized graphene sheets (or nano graphene platelets, NGPs) that entails tedious chemical oxidation/intercalation, rinsing, and high-temperature exfoliation procedures.

A useful approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=\frac{1}{2} d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

It may be noted that if natural graphite powder is dispersed in an oxidant (e.g., a mixture of concentrated sulfuric acid and nitric acid or potassium permanganate) for a sufficient period of time one can obtain a GO material having an oxygen content greater than 30% by weight (preferably >35%), which can be formed into a GO gel state via water rinsing and mechanical shearing.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

In the aforementioned examples, the starting material for the preparation of graphene sheets or NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 4 hours to 5 days). The resulting graphite oxide particles are then rinsed with water several times to adjust the pH values to typically 2-5. The resulting suspension of graphite oxide particles dispersed in water is then subjected to ultrasonication to produce a dispersion of separate graphene oxide sheets dispersed in water. A small amount of reducing agent (e.g. $Na_4B$) may be added to obtain reduced graphene oxide (RGO) sheets.

In order to reduce the time required to produce a precursor solution or suspension, one may choose to oxidize the graphite to some extent for a shorter period of time (e.g., 30 minutes-4 hours) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. Either the already separated graphene sheets (after mechanical shearing) or the un-broken graphite worms or individual graphite flakes are then re-dispersed in water, acid, or organic solvent and ultrasonicated to obtain a graphene dispersion.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication to obtain a graphene dispersion.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce a graphene dispersion of separated graphene sheets (non-oxidized NGPs) dispersed in a liquid medium (e.g. water, alcohol, or organic solvent).

Graphene materials can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS). When the oxygen content of graphene oxide exceeds 30% by weight (more typically when >35%), the GO molecules dispersed or dissolved in water for a GO gel state.

The laminar graphite materials used in the prior art processes for the production of the GIC, graphite oxide, and subsequently made exfoliated graphite, flexible graphite sheets, and graphene platelets were, in most cases, natural graphite. However, the present disclosure is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. *"Halogenated Graphenes: Rapidly Growing Family of Graphene Derivatives"* ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly used in the graphene deposition of polymer component surfaces.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene can contain pristine or non-pristine graphene and the invented method allows for this flexibility. These graphene sheets all can be chemically functionalized.

The present disclosure also provides a process for producing the aforementioned layer of conducting polymer network/graphene-protected anode particles. The process comprises: (a) dispersing multiple particles of the anode active material and multiple graphene sheets in a reacting liquid mass (or precursor solution) to form a reactive slurry, wherein the reacting liquid mass (or precursor solution) comprises a monomer, an initiator or catalyst, a cross-linker, a dopant, an oligomer, a solvent, or a combination thereof; (b) dispensing the reactive slurry to form a wet layer of reactive slurry on a solid substrate surface; and (c) allowing the reacting liquid mass to polymerize and cross-link to form a conducting polymer network gel having both the multiple graphene sheets and the multiple particles of the anode active material dispersed therein or mixed therewith, and removing any residual liquid component from the polymer network gel to obtain the layer of conducting polymer network/graphene-protected anode particles supported on the solid substrate surface.

Figure 4:
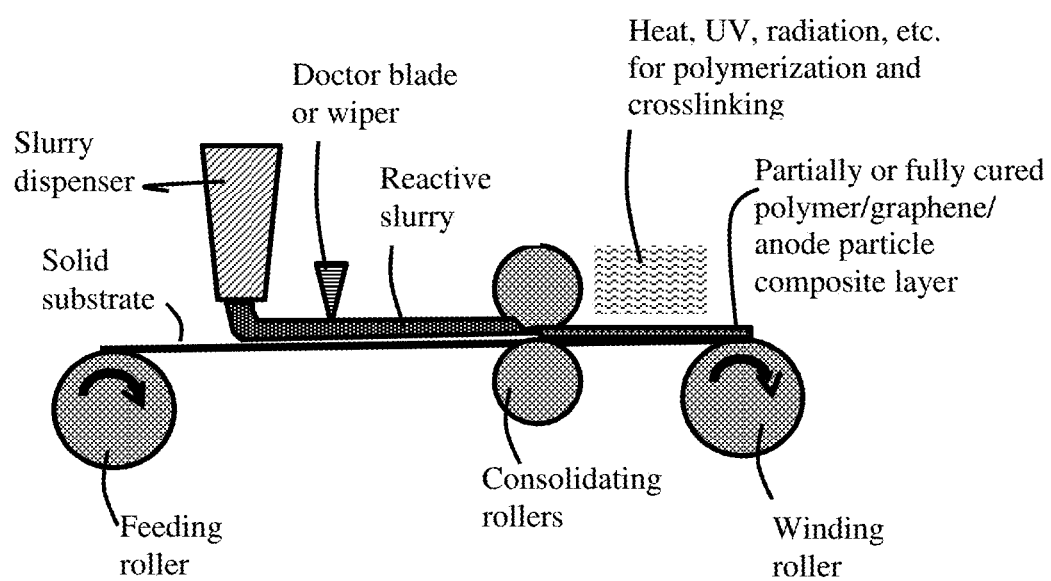
FIG. 4 A diagram showing a continuous process for roll-to-roll production of a roll of anode film or layer, according to some embodiments of the present disclosure.

Sub-process (b) comprises a procedure selected from casting, coating, spraying, printing, or painting the reactive slurry to form the wet layer of reactive slurry on the solid substrate surface. Coating may be selected from slot-die coating, comma coating, reverse-roll coating, dipping coating, micro-gravure coating, ultrasonic-spraying coating. Printing may be selected from screen printing, inkjet printing, gravure printing, etc. As an example, FIG. 4 schematically shows a coating procedure that can be used to produce the anode layer in a multi-layer laminate form in a roll-to-roll manner.

The solid substrate may be selected from plastic film (e.g. PET film), stainless steel film, Cu foil, Al foil, nickel foam sheet, glass sheet, etc.

In certain embodiments, (b) comprises a procedure selected from casting, coating, spraying, printing, or painting the reactive slurry to form the wet layer of reactive slurry on the solid substrate surface.

Sub-process (b) may further comprise a procedure of exposing the reacting liquid mass to heat, UV light, microwaves, infrared, high-energy radiation, or a combination thereof to facilitate or accelerate polymerization and cross-linking of the reacting mass.

In some embodiments, the precursor solution may contain a monomer, an initiator or catalyst, a crosslinking or gelating agent, an oxidizer and/or dopant. During or after the dispensing procedure, one may initiate the polymerization and crosslinking reactions to produce lightly cross-linked networks of conducting polymer chains inside the deposited wet layer. These networks of polymer chains, if containing water or an organic liquid solvent, can become a gel.

In certain embodiments, the solid substrate is selected from a sheet, film, or block of a glass, ceramic, plastic, rubber, or metal and the process further comprises peeling off the wet layer after (b) or peeling off the layer of conducting polymer network/graphene-protected anode particles from the solid substrate after (c) to obtain a free-standing layer of conducting polymer network/graphene-protected anode particles.

The process preferably is a roll-to-roll process wherein (b) comprises (i) continuously feeding the solid substrate from a feeder roller into a deposition zone where the wet layer of reactive slurry is deposited on the solid substrate surface and (ii) collecting the layer of conducting polymer network/graphene-protected anode particles, with or without the supporting solid substrate surface, on a winding roller.

The following examples serve to provide the best modes of practice for the present disclosure and should not be construed as limiting the scope of the disclosure:

Example 1: Preparation of Discrete Graphene Sheets and Anode Layers Containing Anode Particles, Graphene Sheets, and a Conducting Polymer Network Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) was subjected to a thermal shock at 1050° C. for 45 seconds in a tube furnace to form exfoliated graphite (or graphite worms).

Five grams of the resulting exfoliated graphite (graphite worms) were mixed with 2,000 ml alcohol solution consisting of alcohol and distilled water with a ratio of 65:35 for 12 hours to obtain a suspension. Then the mixture or suspension was subjected to ultrasonic irradiation with a power of 200 W for various times. After two hours of sonication, EG particles were effectively fragmented into thin graphene sheets.

Several types of anode active materials in a fine powder form were investigated. These include $Co_3O_4$, Si, Ge, $SiO_x$ (0<x<2), etc., which are used as examples to illustrate the best mode of practice. These active materials were either prepared in house or purchased from commercial sources.

Graphene sheets and desired anode particles, were mixed with a reacting precursor to polyaniline hydrogel (procedure explained in Example 9), respectively. The resulting suspensions were then slot die-coated onto primary surfaces of a Cu foil to form anode layers.

Example 2: Preparation of Graphene from Meso-Carbon Micro-Beads (MCMBs) and Production of Graphene/Anode/Conducting Network Polymer Composite Anode Layers Meso-carbon microbeads (MCMBs) were supplied from China Steel Chemical Co. This material has a density of about 2.24 g/cm³ with a median particle size of about 16 μm. MCMB (10 grams) were intercalated with an acid solution (sulfuric acid, nitric acid, and potassium permanganate at a ratio of 4:1:0.05) for 72 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 1,080° C. for 45 seconds to obtain a graphene material. TEM and atomic force microscopic studies indicate that most of the NGPs were single-layer graphene.

The polypyrrole hydrogel was prepared by following the following procedure: Solution A was prepared by mixing 1 mL $H_2O$ and 0.5 mL phytic acid together and then injecting 142 μL pyrrole into the solution, which was sonicated for 1 min. Solution B was prepared by dissolving 0.114 g ammonium persulfate in 0.5 mL $H_2O$. The solution A and B were separately cooled to 4° C. and then solution B was added into solution A quickly to form a reacting precursor solution (reactive mass).

The anode particulates used in this example include Sn and $SiO_x$ particles and Si nanowires. Carbon-coated Si nanowires (available from Angstron Energy Co., AEC, Dayton, Ohio) were subjected to electrochemical pre-lithiation to prepare several samples containing from 5% to 54% Li. Pre-lithiation of an electrode active material means the material is intercalated or loaded with lithium before a battery anode or cell is made.

A desired amount of these graphene sheets and nano particles were mixed with a pyrrole-based reactive mass to form a reactive suspension and cast onto a surface of a glass substrate. Upon completion of the polymerization and cross-linking procedure, the composite anode layer was peeled off from the glass surface to make a free-standing anode layer. With a sufficient amount of graphene sheets (e.g. >5% by weight, preferably >10%), this free-standing anode layer has a sufficient electrical conductivity to enable the layer itself to act as a current collector as well, avoiding the need to use a conventional current collector, such as Cu foil or stainless steel foil.

Example 3: Preparation of Pristine Graphene Sheets and Graphene/Porous Si/Conducting Network Polymer Composite Anode Layer In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours to obtain pristine graphene sheets.

Porous Si particles were prepared by using HCl to etch out Al in a Si—Al alloy (80% Al alloyed with 20% Si). Etching and leaching out Al produces pores inside Si particles and on Si particle surfaces.

The pristine graphene sheets, along with porous Si particles, were then dispersed in the precursor solution (PEDOT/PSS dissolved in water) to form a reactive suspension, which was then deposited onto a thin Cu foil (8 μm thick) using a comma coater.

Example 4: Preparation of Graphene Fluoride Sheet/Anode Particles/Conducting Polymer Network Composite Anode Layers Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed.

GF sheets were then dispersed in aniline-based reactive mass to form a precursor suspension. The precursor solution or reactive mass may contain a monomer, an initiator or catalyst, a crosslinking or gelating agent, an oxidizer and/or dopant. As an example, 3.6 ml solution A, which contains 400 mM aniline monomer and 120 mM phytic acid, was added and mixed with 280 mg Si nano particles or $SnO_2$ nano particles and 40 mg GF sheets. Subsequently, 1.2 ml solution B, containing 500 mM ammonium persulfate, was added into the above mixture and subjected to bath sonication for 1 min. The mixture suspension was slot die-coated onto a Cu foil. In about 2-3 min, the solution changed color from brown to dark green and became viscous and gel-like, indicating in-situ polymerization of aniline monomer to form the PANi hydrogel with GF sheets and anode particles being dispersed therein.

Example 5: Preparation of Nitrogenated Graphene/Coated Anode Particles/Conducting Network Polymer Composite Anode Layers Graphene oxide (GO), synthesized in Example 2, was finely ground with different proportions of urea and the pelletized mixture heated in a microwave reactor (900 W) for 30 s.

The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water. The resulting dispersion was mixed with a pyrrole-based reacting mass (Example 8) and graphene-encapsulated Si particles (supplied from Angstron Energy Co. Dayton, Ohio) to form a reactive slurry. The reactive slurry was gravure-coated on one primary surface of a roll of Cu foil to produce graphene/anode particles/conducting polymer network composite anode layer on Cu foil in a roll-to-roll manner.

Example 6: Functionalized Graphene/Anode Particles/Conducting Polymer Composite Anode Layers Composite films were prepared from several functionalized graphene-analine dispersions containing 5% by weight of functionalized graphene sheets (few-layer graphene) and 0.01% by weight of aniline oligomer in water. Si nano particles were also added to ensure the Si proportion of 65-85% by weight in the final composite anode layer. Chemical functional groups involved in this study include an azide compound (2-Azidoethanol), alkyl silane, hydroxyl group, carboxyl group, amine group, sulfonate group ($-SO_3H$), and diethylenetriamine (DETA). These functionalized graphene sheets were supplied from Taiwan Graphene Co., Taipei, Taiwan.

Upon coating of the reactive dispersion onto two surfaces of Cu foil and stainless steel foil, the liquid medium (acetone) was removed. The composite coated foil was compressed with a heated press and cured at 35° C. for 45 minutes to obtain functionalized graphene/Si/PANi anode layers coated on a current collector.

Example 7: Production of PEDOT:PS/SiO/Graphene Composite Anode Layers

Poly(3,4-ethylenedioxythiophene):polystyrene sulfonate (PEDOT:PSS) is a polymer mixture of two ionomers. One component is made up of sodium polystyrene sulfonate, which is a sulfonated polystyrene. Part of the sulfonyl groups are deprotonated and carry a negative charge. The other component poly(3,4-ethylenedioxythiophene) or PEDOT is a conjugated polymer, polythiophene, which carries positive charges. Together the two charged polymers form a macromolecular salt. The PEDOT/PSS is soluble in water.

Desired amounts of the graphene sheets and carbon-coated SiO particles (supplied from Angstron Energy Co., Dayton, Ohio) were then dispersed in a PEDOT/PSS-water solution to form a slurry (5% by wt. solid content), which was then coated onto a Cu foil using comma coating.

Example 8: Preparation of Reactive Pyrrole Precursor to Conductive Polymer Networks Polypyrrole networks (cross-linked PPy or PPy hydrogels) were prepared via a two-reactant, one-pot process. Pyrrole (>97% purity) was dissolved in a solvent of water/ethanol (1:1 by weight) to achieve the first reactant having a concentration of 0.209 mol/L.

Then, as the second reactant, aqueous solutions of ferric nitrate ($Fe(NO_3)_3 \cdot 9H_2O$) and ferric sulfate, respectively, were made at concentrations of 0.5 mol/L. Subsequently, polymerization of the network gels was carried out in an ice bath at 0° C., by mixing volumes of the two reactants at 1:1 molar ratios of pyrrole:ferric salt, to create a reacting mixture with a total of 4 mL. A desired amount of graphene sheets was dispersed in this reacting mixture. After rigorously stirring for 1 minutes, the slurry mass was allowed to stand and polymerization and gelation began after 5 minutes. A pyrrole:ferric salt molar ratio of 1:1, which is stoichiometrically deficient of ferric salt, leads to secondary growth (cross-linking) of the polypyrrole network, which could continue from 1 day to 30 days to produce cohesive hydrogels of high elasticity upon removal of the liquid phase (water and ethanol).

Example 9: Production of Precursor Reactive Mass to Polyaniline Gel Network

The precursor of a conducting network polymer, such as cross-linkable polyaniline and polypyrrole, may contain a monomer, an initiator or catalyst, a crosslinking or gelating agent, an oxidizer and/or dopant. As an example, 3.6 ml aqueous solution A, which contains 400 mM aniline monomer and 120 mM phytic acid, was added and mixed with 280 mg graphene sheets and desired anode particles. Subsequently, 1.2 ml solution B, containing 500 mM ammonium persulfate was added into the above mixture and subjected to bath sonication for 1 min. The resulting reactive suspension was coated onto a stainless steel foil surface. In about 5 min, the solution changed color from brown to dark green and became viscous and gel-like, indicating in-situ polymerization of aniline monomer to form the PANi hydrogel. The resulting film was cured at 50° C. for 2 hours to obtain a PANi network polymer-/graphene composite film.

Example 10: Heparin-Based Material as a Curing Agent for the Preparation of a Conducting Polymer Network The conducting polymer may be produced from a monomer using heparin-based crosslinking or gelating agent (e.g. in addition to phytic acid). Aqueous solutions of heparin (0.210% w/w) were prepared using 5M NaOH. Photo-cross-linkable heparin methacrylate (Hep-MA) precursors were prepared by combining heparin (porcine source, Mw ~1719 kDa) incubated with methacrylic anhydride (MA) and adjusted to pH=8. The degree of substitution (DS) of methacrylate groups covalently linked to heparin precursors was measured by 1H nuclear magnetic resonance. The DS was determined from integral ratios of peaks of the methacrylate groups at 6.2 ppm compared to peak corresponding to methyl groups in heparin at 2.05 ppm.

Solutions used for photopolymerization were incubated with 2-methyl-1-[4-(hydeoxyethoxy)phenyl]-2-methyl-1-propanone (Irgacure 2959) to create final concentrations of 0.5% (w/w) of photoinitiator. Gels were photo-cross-linked using UV illumination for 30-60 min ($\lambda$max=365 nm, 10 mW/cm$^2$). Hep-MA/PANI dual-networks were formed by sequentially incubating cross-linked Hep-MA hydrogels in aqueous solutions of ANI ([ANI]$_0$, between 0.1 and 2 M, 10 min) and acidic solutions of APS ([APS]$_0$, between 12.5 mM and 2 M, 20120 min). The gel fraction of Hep-MA/PANI dual networks was recovered by washing in di H$_2$O after oxidative polymerization. Graphene sheets and anode particles could be added into the reacting mass during various stages of reactions before casting or coating, but preferably added right before photopolymerization.

Example 11: Preparation and Electrochemical Testing of Various Battery Cells

For most of cathode active materials investigated, we prepared lithium-ion cells using the conventional slurry coating method. A typical cathode composition includes 85 wt. % active material (e.g., NCM, NCA, and LiCoO$_2$), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Al foil, the electrodes were dried at 120° C. in vacuum for 2 h to remove the solvent. An anode layer (e.g. from those prepared in Examples 1-8), a separator layer (e.g. Celgard 2400 membrane), and a cathode layer are then laminated together and housed in a plastic-Al envelop. The cell is then injected with 1 M LiPF$_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box. In some tests, a half-cell configuration in a coin cell format was used, wherein the produced anode layer was the testing electrode and a piece of lithium metal was the counter-electrode.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

Figure 5:
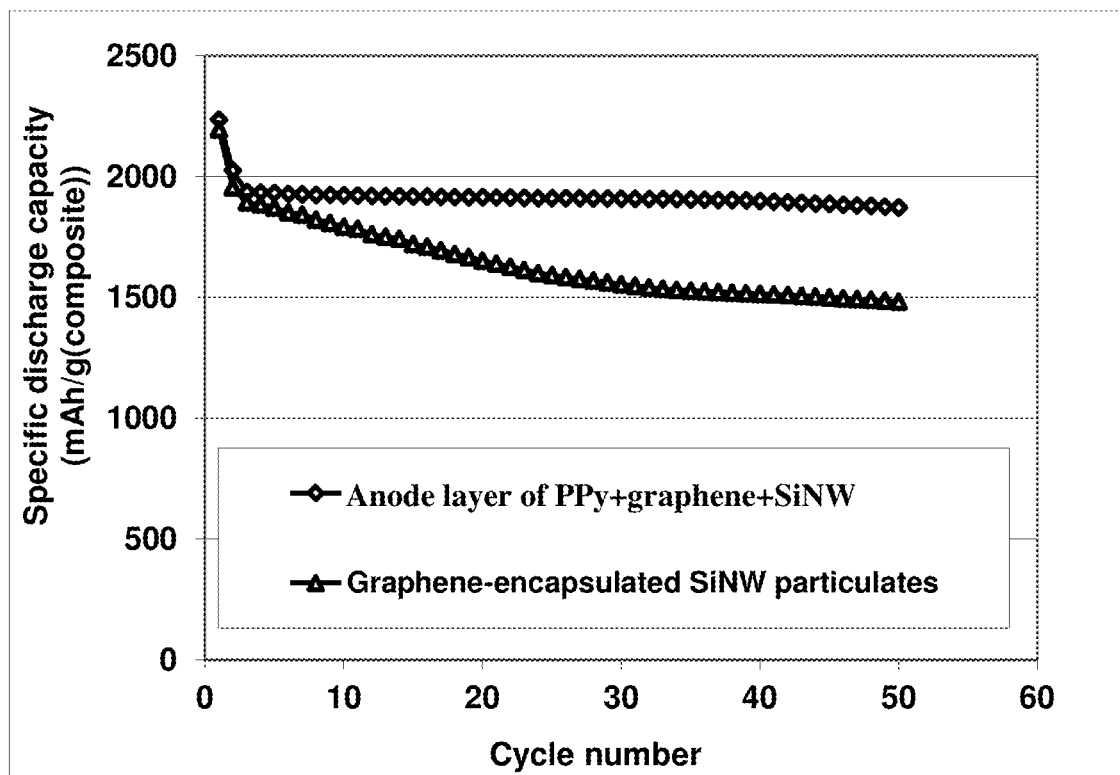
FIG. 5 The cycling behaviors of two lithium-ion cells: one cell featuring an anode layer of graphene/polypyrrole network-protected Si nanowires (graphene sheets and Si nanowires embedded in a polypyrrole network polymer matrix) and the other featuring an anode layer containing particulates of graphene-protected, amorphous carbon-encapsulated Si nanowires as the anode active material.

FIG. 5 shows the cycling behaviors of two lithium-ion cells: one cell featuring an anode layer of graphene/polypyrrole network-protected Si nanowires (graphene sheets and Si nanowires embedded in a polypyrrole network polymer matrix) and the other featuring an anode layer containing particulates of graphene-protected, amorphous carbon-encapsulated Si nanowires as the anode active material. This is but one of the many examples that have demonstrated that the presently invented anode layer of graphene/conducting network polymer-protected anode particles (directly formed into an anode layer on a current collector surface) enables a lithium-ion battery to exhibit significantly more stable charge/discharge cycle.

The invention claimed is:

1. A layer of conducting polymer network/graphene-protected anode particles for a lithium battery anode, said layer comprising a mixture of multiple graphene sheets and multiple primary particles of an anode active material that are dispersed in or bonded by a conducting polymer network, wherein the primary particles have a diameter or thickness from 0.5 nm to 20 m and occupy from 30% to 98% by weight, the graphene sheets occupy from 0.01% to 25% by weight, and the conducting polymer network occupies from 1% to 30% by weight based on the total mixture weight and wherein the graphene sheets and the conducting polymer network together form dual conducting pathways for both electrons and lithium ions, wherein said conducting polymer network comprises a polyaniline hydrogel, polypyrrole hydrogel, or polythiophene hydrogel.

2. The layer of claim 1, wherein the multiple graphene sheets contain single-layer or few-layer graphene, wherein said few-layer graphene sheets have 2-10 layers of stacked graphene planes having an inter-plane spacing $d_{002}$ from 0.3354 nm to 0.7 nm as measured by X-ray diffraction and said single-layer or few-layer graphene sheets contain a pristine graphene material having essentially zero % of non-carbon elements, or a non-pristine graphene material having 0.001% to 50% by weight of non-carbon elements.

3. The layer of claim 2, wherein said non-pristine graphene is selected from graphene oxide, reduced graphene oxide, graphene fluoride, graphene chloride, graphene bromide, graphene iodide, hydrogenated graphene, doped graphene, chemically functionalized graphene, or a combination thereof.

4. The layer of claim 1, wherein said multiple graphene sheets exceed percolation threshold that form a 3D network of electron-conducting pathways.

5. The layer of claim 1, wherein said anode active material primary particles contain particles pre-coated with a film of a conductive material selected from a carbon, pitch, carbonized resin, non-crosslinked conductive polymer, conductive organic material, metal coating, metal oxide shell, graphene, or a combination thereof.

6. The layer of claim 1, wherein said anode active material primary particles are selected from the group consisting of:
(A) lithiated and un-lithiated silicon (Si), germanium (Ge), tin (Sn), lead (Pb), phosphorus (P), antimony (Sb), bismuth (Bi), zinc (Zn), aluminum (Al), titanium (Ti), nickel (Ni), cobalt (Co), niobium (Nb), and cadmium (Cd);
(B) lithiated and un-lithiated alloys or intermetallic compounds of Si, Ge, Sn, Pb, P, Sb, Bi, Zn, Al, Ti, Ni, Co, Nb, or Cd with other elements;
(C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites;
(D) lithiated and un-lithiated salts and hydroxides of Sn;
(E) lithium aluminate, lithium transition metal oxide; and combinations thereof.

7. The layer of claim 1, wherein said anode active material particles are porous having surface pores, internal pores, or both surface and internal pores.

8. The layer of claim 1, wherein said layer has pores dispersed therein.

9. The layer of claim 1, wherein said anode active material particles include nano-scaled particles, flakes, beads, pellets, spheres, wires, fibers, filaments, discs, ribbons, tubes, or rods, having a diameter or thickness from 2 nm to 100 nm.

10. The layer of claim 1, further comprising an electron-conducting material selected from carbon nanotubes, carbon nano-fibers, carbon fibers, graphite fibers, expanded graphite flakes, coke, carbon particles, or a combination thereof.

11. The layer of claim 1, further comprising a lithium ion-conducing polymer that is blended with the conducting polymer network wherein the lithium ion-conducting polymer is selected from poly(ethylene oxide), polypropylene oxide, poly(ethylene glycol), poly(acrylonitrile), poly(methyl methacrylate), poly(vinylidene fluoride), poly(bis((methoxyethoxy)ethoxy)-phosphazene, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

12. The layer of claim 1, further comprising a lithium ion-conducing material dispersed therein wherein the lithium ion-conducting material is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, wherein X=F, Cl, I, or Br, R=a hydrocarbon group, $0<x\leq1$, $1\leq y\leq4$, lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), lithium bis(oxalato)borate (LiBOB), lithium oxalyldifluoroborate ($LiBF_2C_2O_4$), lithium nitrate ($LiNO_3$), Li-perfluoroethyl-phosphate ($LiPF_3(CF_2CF_3)_3$), lithium bisperfluoroethylsulfonylimide (LiBETI), lithium bis(trifluoromethanesulfonyl)imide, lithium bis(fluorosulfonyl)imide, an ionic liquid-based lithium salt, or a combination thereof.

13. The layer of claim 1, wherein the layer is in a form of a roll of film wound on a roller or is cut from a roll of film of said conducting polymer network/graphene-protected anode particles.

14. The layer of claim 1, wherein the layer is supported by a layer of anode current collector selected from a thin foil, foam, or fabric of an electrically conducting material.

* * * * *